US010136281B2

(12) United States Patent
Chen et al.

(10) Patent No.: US 10,136,281 B2
(45) Date of Patent: Nov. 20, 2018

(54) METHOD FOR LOGGING IN TO APPLICATION, SERVER, TERMINAL, AND NONVOLATILE COMPUTER READABLE STORAGE MEDIUM

(71) Applicant: Tencent Technology (Shenzhen) Company Limited, Shenzhen (CN)

(72) Inventors: Zhang Chen, Shenzhen (CN); Haiyu Liu, Shenzhen (CN); Jingfu Chen, Shenzhen (CN); Yuanfang Lv, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/692,238

(22) Filed: Aug. 31, 2017

(65) Prior Publication Data
US 2017/0366917 A1 Dec. 21, 2017

Related U.S. Application Data (63) Continuation-in-part of application No. PCT/CN2016/084344, filed on Jun. 1, 2016.

(30) Foreign Application Priority Data

Oct. 16, 2015 (CN) .......................... 2015 1 0671238

(51) Int. Cl.
*H04B 1/38* (2015.01)
*H04W 4/50* (2018.01)
(Continued)

(52) U.S. Cl.
CPC .............. *H04W 4/50* (2018.02); *G06F 21/31* (2013.01); *G06F 21/6245* (2013.01); *H04L 63/0815* (2013.01); *H04W 12/06* (2013.01)

(58) Field of Classification Search
CPC .................................. H04W 4/50; H04W 12/06
(Continued)

(56) References Cited

U.S. PATENT DOCUMENTS 9,887,999 B2 * 2/2018 Dong .................. H04L 63/0884
2013/0219479 A1 * 8/2013 DeSoto ................ H04W 12/06
726/6

(Continued)

FOREIGN PATENT DOCUMENTS

CN 101286843 A 10/2008
CN 103188221 A 7/2013
(Continued)

OTHER PUBLICATIONS

Tencent Technology, ISRWO, PCT/CN2016/084344, Aug. 24, 2016, 7 pgs.
(Continued)

Primary Examiner — April G Gonzales
(74) Attorney, Agent, or Firm — Morgan, Lewis & Bockius LLP (57) ABSTRACT

A method is performed at an application platform running at a computer server for logging in to an application (App) by an end user, the method comprising: receiving a login request from a server associated with the application; obtaining an App identity (ID) and a key from the login request; verifying the obtained App ID and key with predefined information associated with the application and the terminal; and when the verification succeeds, sending, to the application server, a message including first user account number information of the end user at the application platform. The application server is configured to generate second user account number information of the end user at the application according to the first user account number information and return the second user account number information to the terminal so that the end user can log into the application using the second user account number information.

20 Claims, 7 Drawing Sheets (51) Int. Cl.
*G06F 21/62* (2013.01)
*G06F 21/31* (2013.01)
*H04L 29/06* (2006.01)
*H04W 12/06* (2009.01)

(58) Field of Classification Search
USPC ........................................... 455/90.1
See application file for complete search history.

(56) References Cited

U.S. PATENT DOCUMENTS

2014/0089202 A1* 3/2014 Bond .................... H04L 9/0822
713/166
2014/0289508 A1* 9/2014 Wang .................. H04L 63/0853
713/155
2014/0310793 A1* 10/2014 Liu ....................... H04L 63/083
726/8
2015/0089610 A1* 3/2015 DeSoto ................. H04W 12/06
726/6

FOREIGN PATENT DOCUMENTS

| CN | 103609090 A | 2/2014 |
| CN | 104268457 A | 1/2015 |
| WO | WO 2014146446 A1 | 9/2014 |

OTHER PUBLICATIONS

Tencent Technology, IPRP, PCT/CN2016/084344, Apr. 17, 2018, 6 pgs.

* cited by examiner

METHOD FOR LOGGING IN TO APPLICATION, SERVER, TERMINAL, AND NONVOLATILE COMPUTER READABLE STORAGE MEDIUM

RELATED APPLICATIONS

This application is a continuation-in-part of PCT/CN2016/084344, entitled "METHOD FOR LOGGING IN TO APPLICATION, SERVER, TERMINAL, AND NON-VOLATILE COMPUTER READABLE STORAGE MEDIUM" filed on Jun. 1, 2016, which claims priority to Chinese Patent Application No. 201510671238.1, filed with the State Intellectual Property Office of the People's Republic of China on Oct. 16, 2015, and entitled "SERVER, TERMINAL, AND NON-VOLATILE COMPUTER READABLE STORAGE MEDIUM", both of which are incorporated herein by reference in their entirety.

FIELD OF THE TECHNOLOGY

The present disclosure relates to the field of Internet technologies, and in particular, to a method for logging in to an application (App), a server, a terminal, and a nonvolatile computer readable storage medium.

BACKGROUND OF THE DISCLOSURE

An application is a program that can provide a single or a plurality of functions or services. An App platform is a distribution platform providing an App downloading service for smartphones, and generally, is also an App.

Smartphones have advantages of high performance and abundant interaction, and can provide flexible Apps and content to users for use, bringing great convenience to the users. As interaction capabilities and operational performance of smartphones are continuously improved, and a mobile network speed is increased and a tariff is decreased, users use the smartphones for a longer time every day, and various requirements in daily life are met by using the smartphones. To meet daily life requirements of the users, a large number of life service Apps are generated. Life services may include every aspect of the daily life, such as catering, entertainment, renting, house purchase, working, traveling, education, and training. A user downloads a corresponding App from an App platform and installs the corresponding App according to requirements of the user. After the App is installed each time, the user needs to fill in personal information for registration. Therefore, operations are complex. Moreover, because the user needs to fill in the personal information during each registration, the personal information is easily leaked, and information security is low.

SUMMARY

Based on this, it is necessary to provide a method for logging in to an App, a server, a terminal, and a nonvolatile computer readable storage medium that can improve convenience of operations, reduce a probability that personal information of a user is leaked, and improve security of the personal information of the user.

A method for logging in to an App is provided, including:
receiving an App identity (ID) and a key, which are sent according to a login request of an App, of the App, the App ID and the key being configured by an App platform;
verifying the obtained App ID and key; and
sending, if the verification succeeds, to the App, a message that the verification succeeds and the App is allowed to obtain first user account number information of a user on the App platform, so that the App obtains the first user account number information according to the message, generates second user account number information of the App according to the first user account number information, and logs in to the App according to the generated second user account number information.

A method for logging in to an App is provided, including:
obtaining a login request, and obtaining an App ID and a key of an App according to the login request, the App ID and the key being configured by an App platform;
sending the App ID and the key to the App platform;
receiving a message that is sent after verification performed by the App platform on the App ID and the key succeeds and that the verification succeeds and the App is allowed to obtain first user account number information of a user on the App platform;
obtaining the first user account number information according to the message, and generating second user account number information of the App according to the first user account number information; and performing login according to the second user account number information.

A server is provided, including a memory and a processor, the memory storing computer readable instructions, and the processor executing the instructions, so as to perform the following steps:
receiving an App ID and a key, which are sent according to a login request of an App, of the App, the App ID and the key being configured by an App platform;
verifying the obtained App ID and key; and
sending, if the verification succeeds, to the App, a message that the verification succeeds and the App is allowed to obtain first user account number information of a user on the App platform, so that the App obtains the first user account number information according to the message, generates second user account number information of the App according to the first user account number information, and logs in to the App according to the generated second user account number information.

A terminal is provided, including a memory and a processor, the memory storing computer readable instructions, and the processor executing the instructions, so as to perform the following steps:
obtaining a login request, and obtaining an App ID and a key of an App according to the login request, the App ID and the key being configured by an App platform;
sending the App ID and the key to the App platform;
receiving a message that is sent after verification performed by the App platform on the App ID and the key succeeds and that the verification succeeds and the App is allowed to obtain first user account number information of a user on the App platform;
obtaining the first user account number information according to the message, and generating second user account number information of the App according to the first user account number information; and performing login according to the second user account number information.

One or more nonvolatile computer readable storage media including computer readable instructions are provided, one or more processors executing the computer readable instructions, so as to perform the following steps:

receiving an App ID and a key, which are sent according to a login request of an App, of the App, the App ID and the key being configured by an App platform;

verifying the obtained App ID and key; and sending, if the verification succeeds, to the App, a message that the verification succeeds and the App is allowed to obtain first user account number information of a user on the App platform, so that the App obtains the first user account number information according to the message, generates second user account number information of the App according to the first user account number information, and logs in to the App according to the generated second user account number information.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings and the embodiments. It should be understood that the specific embodiments described herein are merely used to explain the present disclosure, and are not intend to limit the present disclosure.

Figure 1:
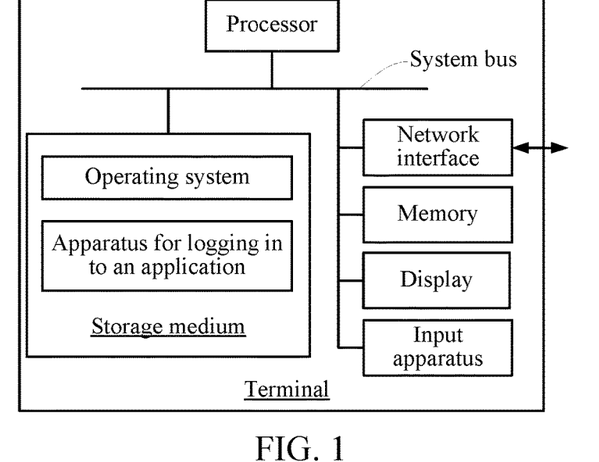
FIG. 1 is a schematic diagram of an internal structure of a terminal according to an embodiment.

FIG. 1 is a schematic diagram of an internal structure of a terminal according to an embodiment. As shown in FIG. 1, the terminal includes a processor, a storage medium, a memory, a network interface, a display, and an input apparatus that are connected by using a system bus. The storage medium of the terminal stores an operating system, and further includes an apparatus for logging in to an App. The apparatus for logging in to an App is configured to perform a method for logging in to an App. The processor is configured to provide compute and control capabilities, to support running of the entire terminal. The memory in the terminal provides an environment for running of the apparatus, which is in the storage medium, for logging in to an App. The network interface is configured to perform network communication with a server, for example, sending an App downloading request to an App platform server, and receiving an App file package returned by the App platform server. The display of the terminal may be a liquid crystal display, an electronic ink display, or the like. The input apparatus may be a touch layer covering the display, or may be a key, a track ball, or a touch panel that is disposed on a housing of the terminal, or may be a keyboard, a touch panel, or a mouse that is externally connected. The terminal may be a smartphone, a tablet computer, or a personal digital assistant. It may be understood by a person skilled in the art that the structure shown in FIG. 1 is merely a block diagram of a part of a structure related to the solution of this application, and does not constitute a limitation to the terminal to which the solution of this application is applied. A specific terminal may include more components or fewer components than those shown in the figure, or some components may be combined, or a different component deployment may be used.

Figure 2:
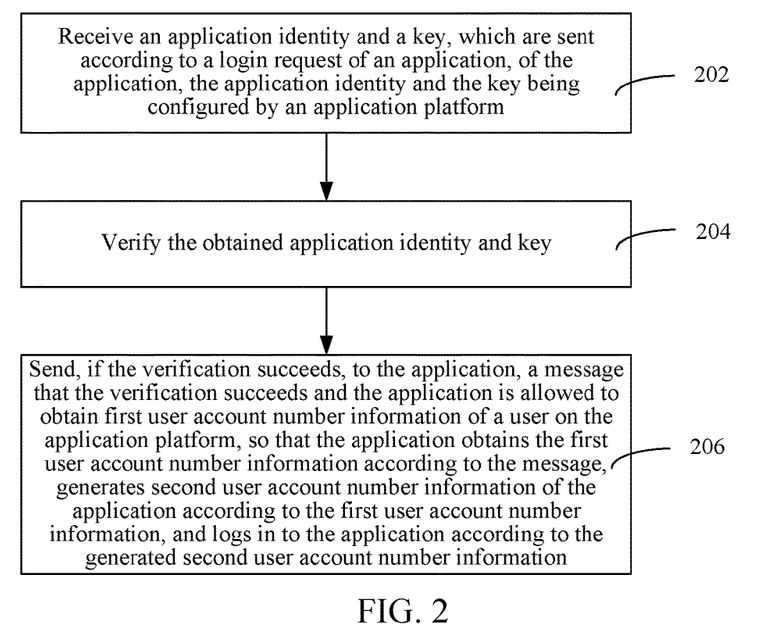
FIG. 2 is a flowchart of a method for logging in to an App according to an embodiment.

FIG. 2 is a flowchart of a method for logging in to an App according to an embodiment. Note that there are three entities involved in the process, including an end user using a terminal like the one shown in FIG. 1 to access the App, the App itself running at a server (also known as "application server") remotely located from the terminal, and an App platform running at another server (also known as "application platform server") remotely located from the terminal. The application platform server typically includes one or more processing units (CPU's) for executing modules, programs and/or instructions stored in memory and thereby performing processing operations; one or more network or other communications interfaces; and one or more communication buses for interconnecting these components. The communication buses optionally include circuitry (sometimes called a chipset) that interconnects and controls communications between system components. The memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory may optionally include one or more storage devices remotely located from the CPU(s). The memory, or alternately the non-volatile memory device(s) within memory, comprises a non-transitory computer readable storage medium.

In some embodiments, the relationship between the three entities are as follows: (i) the end user at the terminal logs into the application platform server and downloads a client side of the application from the application platform onto the terminal and have the client side of the application installed on the terminal; (ii) the end user then sends a login request to the application server using the client side of the application installed on the terminal; and (iii) the application server then submits a login request to the application platform server for verifying with the application platform whether the initial login request from the terminal should be granted or not. The rest of the process is depicted below in connection with FIG. 2.

As shown in FIG. 2, the method for logging in to the App is described from the perspective of the application platform server, and includes the following steps:

Step 202: Receive an App ID and a key, which are sent according to a login request from the application server, of the App, the App ID and the key being configured by an App platform. In some embodiments, the login request from the application server is the same as the initial login request submitted by the end user from the terminal. In this case, the application server merely forwards the initial login request to the application platform server. In some other embodiments, the login request from the application server is different from the initial login request from the terminal. For example, the application server may add additional information to the initial login request and encrypt the initial request.

In some embodiments, when the terminal initially downloads the client side of the application, the application platform server assigns the App ID and the key to the downloaded instance of the client side of the application and sends the App ID and the key to the terminal. In some embodiments, such information is encrypted before it is returned to the terminal. Meanwhile, the application platform server also stores such information in its database as being associated with the user account information of the end user at the application platform. The App ID and the key are included in the initial login request submitted by the end user at the terminal and then included in the login request from the application server as well. Upon receipt of the login request, the application platform first extracts the App ID and the key from the login request, which may need to be decrypted.

Specifically, an App is App program software that can provide a single or a plurality of functions or services. An App platform is a distribution platform providing an App downloading service, and generally, is also an App. After obtaining an App uploaded by an App provider, the App platform distributes a unique App ID and a corresponding key to the App, so as to verify the App subsequently.

When using an App, a user initiates a request for logging in to the App, obtains an App ID and a key according to the login request, and sends the App ID and the key to the App platform, so as to verify validity of the App.

Step 204: Verify the obtained App ID and key with predefined information associated with the application and the terminal.

Specifically, after receiving the sent App ID and the corresponding key, the App platform compares the received App ID and key with the predefined information including an App ID and a key, which are stored on the App platform, of the App. As noted above, such predefined information is generated when the terminal downloads the client side of the application and it is stored for verifying a login request from the application server. If the received App ID and key are the same as the App ID and the key, which are stored on the App platform, of the App, the verification succeeds; or if the received App ID and key are different from the App ID and the key, which are stored on the App platform, of the App, the verification fails. After the verification succeeds, a message that the verification succeeds and the App is allowed to obtain first user account number information of the user on the App platform may be sent to the App, and the message that the verification succeeds and the App is allowed to obtain the first user account number information of the user on the App platform is displayed on a webpage corresponding to the App or on an App login interface. After the verification fails, prompt information that the verification fails may be sent to the App, and the prompt information that the verification fails is displayed on the webpage corresponding to the App or on the App login interface.

A request for registering with the App platform by the user is obtained, the first user account number information is distributed according to the registration request, and personal information filled in by the user is obtained. The personal information of the user may include one or more of a user name, an ID card number, a mobile communication identifier, an email box, a work address, an employer, or a dwelling address, and the present disclosure is not limited thereto. The first user account number information may include a user account number, a user name, and the like of the user on the App platform. The user account number may be a sequence number, a mobile number of the user, an email box of the user, an instant communication number, or the like distributed by the App platform. The user name may be a name including one or more of a number, a letter, or a character, may be another name or the like.

Step 206: Send, if the verification succeeds, to the App, a message that the verification succeeds and the App is allowed to obtain first user account number information of a user on the App platform, so that the App obtains the first user account number information according to the message, generates second user account number information of the App according to the first user account number information, and logs in to the App according to the generated second user account number information.

In some embodiments, the first user account number information is assigned to the end user for logging into the application platform. For example, as a user of the application platform server, the end user needs to have a pair of user identifier and password to login to the application platform and search for applications of interest for installing on the terminal. One advantage of the present application is that the end user does not have to create a separate user account using a pair of user identifier and password for each application it downloads from the application platform. Instead, all the applications managed by the application platform can dynamically generate second user account number information for any terminal that has downloaded the applications in response to a login request from the terminal as described in the application. In some embodiments, the second user account number information is generated by the application server based on the first user account number information and maybe the predefined information including the App ID and the key and is then returned to the terminal and the application platform server. For example, the second user account number information is encrypted by the key before being returned to the terminal. For example, the terminal may receive a hyperlink to access the service at the application server. By doing so, even the end user at the terminal does not know the second user account information at the application server although it has no difficulty in accessing the services offered by the application server. In some embodiments, the second user account number information of the end user has an expiration timestamp such that a new login request is sent to the application platform for generating new second user account number information of the end user after the expiration timestamp. This timestamp mechanism provides further protection for preventing an unauthorized third-party from logging into the application server using the end user's user account information. In sum, the login process of the present application does not require that the end user to memorize any user account's identifier and password for any application hosted by the application platform.

Specifically, after the verification performed on the App succeeds, the App platform may grant a permission of allowing the App to obtain the first user account number information of the user on the App platform. After obtaining the first user account number information, the App may combine the second user account number information with reference to the App ID, or generate the second user account number information by adding a predetermined character and the like, or combine the first user account number information and the App ID to calculate an information digest value, and use the information digest value as the second user account number information, and so on. The present disclosure is not limited thereto.

In the method for logging in to an App, after verification on an App ID and a key succeeds, an App is allowed to obtain first user account number information of a user on an App platform, and generates second user account number information according to the first user account number information, and the App is logged in to by using the second user account number information. The user no longer needs to register an account number with the App. In this way, the user account number is synchronized and shared, and operations are convenient. Moreover, personal information of a user does not need to be filled in each installed App, reducing probability that the personal information of the user is leaked, and improving information security.

It should be noted that an App may be an Internet life service App. The Internet life service App may include various Apps in the daily life of people, for example, Apps of clothing, food, shelter, means of travelling that are related to life such as catering, entertainment, renting, house purchase, working, travelling, education, and training, which are referred to as O2O for short. The App and the App platform directly perform data communication and data processing by using the AppLink-O2O protocol. The AppLink-O2O protocol is a data processing protocol, is used to process and record content of various life services, and is used to structurize the content, so that the content is applicable to sort an index of a search engine, and each life service App has a mutual jump capability.

In an embodiment, the method for logging in to an App further includes: obtaining content submitted by the App; and performing structured processing on the committed content of the App, and establishing an index.

Specifically, the content submitted by the App may include some content or all content. For example, there are 100 objects or services on an O2O service App, and according to requirements, only some (for example, 20) of the 100 objects or services may be committed to the App platform, or all the 100 objects or services are committed to the App platform.

The content submitted by the App according to the AppLink-O2O protocol is obtained. Each service or object in the content of the App may include a title, descriptions, a price, transportation costs, a picture, and the like, and the present disclosure is not limited thereto. For example, if the committed content of the App includes a manicure service, committed content of the manicure service includes (1) to (5):

(1) the name of nails;
(2) descriptions of a manicure style;
(3) a price of the manicure service;
(4) transportation costs of the manicure service; and
(5) a picture of the nails.

Describing the committed content of the App according to (1) to (5) is performing structured processing on the content, to obtain structured data of the content. Then, an index may be established according to the structured data of the content. For example, an object is indexed according to a name of the object. Therefore, the object name is used as an index.

In addition, after structured processing is performed on the committed content of the App, the App is classified according to the committed content of the App, and Apps of the same class are placed together.

The content of the App in the AppLink-O2O protocol may include one or more of a content name, description information of an object/service, a label of the object/service, a class to which the object/service belongs, an original price of the object/service, a selling price of the object/service, a time at which the service starts every day, a time at which the service ends every day, a picture of the object/service, transportation costs of the object/service, object stock, a sales volume of the object, a service-supported region, discount information, the longitude of a service region, or the latitude of the service region. However, the present disclosure is not limited thereto. The object may be an entity object or a virtual object, and the entity object may be clothes, a ball, or the like. The virtual object may be a recharge currency, a game currency, an electronic coupon, or the like. The service may include various services, such as housekeeping services, a manicure service, and the like. The discount information may be a discount of a service, a discount of an object, and the like. The latitude and longitude of the service region are the geographical coordinates of the latitude and the longitude, so that a user selects an object or a service according to geographical location information.

Key attributes of the content of the App in the AppLink-O2O protocol are shown in Table 1.

TABLE 1

| Attribute number | Key attribute of the AppLink-O2O protocol |
| --- | --- |
| 1 | Content name |
| 2 | description information of an object/service |
| 3 | Label of the object/service label |
| 4 | Class to which the object/service belongs |
| 5 | Original price of the object/service |
| 6 | Selling price of the object/service |
| 7 | Time at which the service starts each day |
| 8 | Time at which the service ends each day |
| 9 | Picture of the object/service |
| 10 | Transportation costs of the object/service |
| 11 | Object stock |
| 12 | Sales volume of the object |
| 13 | Service-supported region |
| 14 | Discount information |
| 15 | Longitude of a service region |
| 16 | Latitude of the service region |

Structured processing is performed on the content submitted by the App, and the index is established, so that it is easy to classify and search structured content information, the content information is aggregated together, and a user may directly find a required service. Moreover, for a region and a service or an object, searching may also be performed, improving information searching efficiency.

In another embodiment, an open software development kit (SDK) may be provided on the App platform, the SDK is provided to the App provider, and after the SDK is integrated in the App, the App commits content by using the SDK.

In an embodiment, after the step of performing structured processing on the committed content, and establishing an index, the method for logging in to an App further includes: obtaining a search request; finding a corresponding App according to the search request; and obtaining a content details viewing request or an order placing request of the selected App, and enabling the corresponding installed App according to the details viewing request or the order placing request or prompting for installation of the App.

Specifically, the search request may include one or more search keywords, and the search keywords may include a content name, a location (e.g., the latitude and the longitude) of a service, a price range of the service, and the like. Searching is performed based on the index according to the search request, and a corresponding App may be found. Found Apps may be displayed in a descending order of matching degrees. A matching degree is a degree of matching the search keywords in the search request.

A hyperlink may be embedded into the content details viewing request or the order placing request, and the already installed corresponding App is enabled according to the hyperlink. If the corresponding App is not installed, the installation of the App may be prompted for. The hyperlink is one part of a webpage, and is an element allowing a connection between webpages or between websites.

Viewing content details is viewing more information about the content. The order placing request is a request generated when an order is placed after an object or a service is found in an App.

In an embodiment, the method for logging in to an App further includes: periodically obtaining updated content of the App; and updating content of the App on the App platform according to the updated content of the App.

Specifically, a periodic period may be negotiated by the App provider with the App platform. For example, update is performed once every two hours, once every one day, or the like. The updated content of the App may be descriptions, a stock status, price information, a picture, a time at which a service starts every day and a time at which a service ends every day, discount information, or the like, and the present disclosure is not limited thereto.

In addition, the method for logging in to an App further includes: obtaining stock status information of an object or a service that is sent by the App in real time; and updating stock data of the object or the service of the App on the App platform according to the stock status information of the object or the service.

The stock status information varies at any time. This can improve update frequency, the stock data of the object or the service of the App on the App platform is conveniently updated in time, and learning latest stock data in time by a user is ensured.

Figure 3:
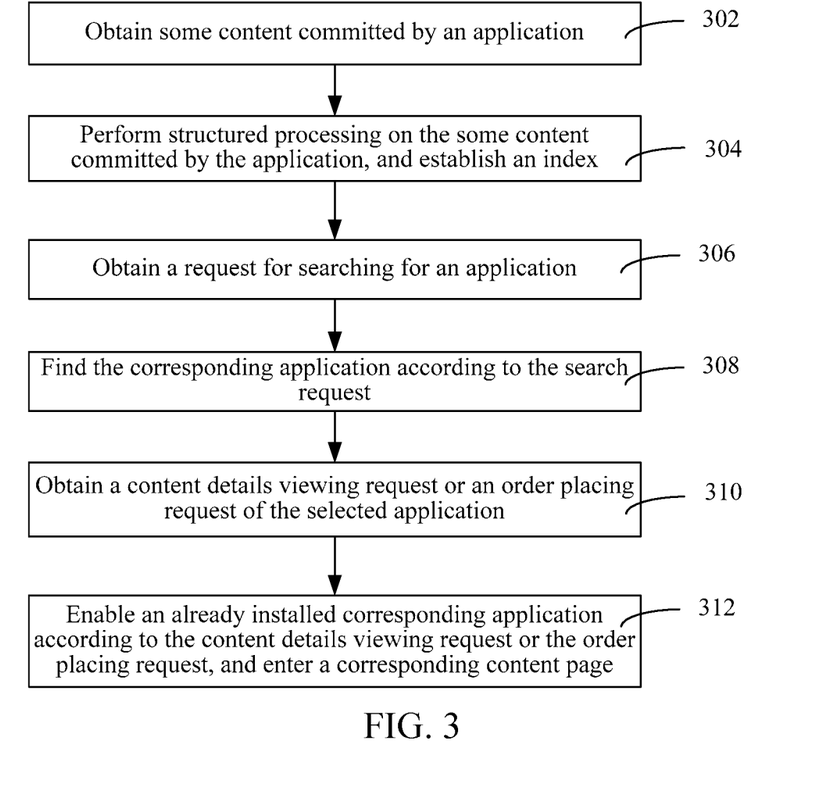
FIG. 3 is a processing flowchart of committing some content by an App according to an embodiment.

FIG. 3 is a processing flowchart of committing some content by an App according to an embodiment. As shown in FIG. 3, processing steps of committing the some content by the App include:

Step 302: Obtain the some content submitted by the App.

Specifically, the App platform obtains the some content, which is selected and submitted by an App provider, of the App.

Step 304: Perform structured processing on the some content submitted by the App, and establish an index.

Specifically, structured processing is performed on each service or object in the some content submitted by the App, for example, structured processing is performed according to a name, descriptions, a price, a picture, or the like of each service or object, and the corresponding index is established.

Step 306: Obtain a request for searching for an App.

Specifically, a search request of a user on the App platform is obtained, the search request may include one or more search keywords, and the search keywords may be set as required.

Step 308: Find the corresponding App according to the search request.

Step 310: Obtain a content details viewing request or an order placing request of the selected App.

Step 312: Enable an already installed corresponding App according to the content details viewing request or the order placing request, and enter a corresponding content page.

Structured processing is performed on the some content submitted by the App. Therefore, Apps are conveniently managed together, searching is performed conveniently, and search efficiency is improved.

Figure 4:
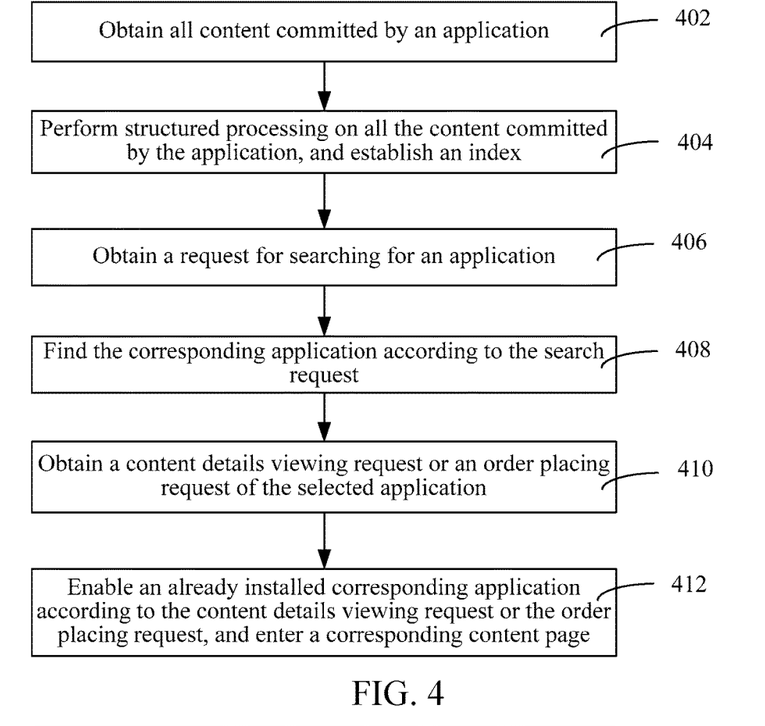
FIG. 4 is a processing flowchart of committing all content by an App according to an embodiment.

FIG. 4 is a processing flowchart of committing all content by an App according to an embodiment. As shown in FIG. 4, processing steps of committing all the content by the App include:

Step 402: Obtain all the content submitted by the App.

Step 404: Perform structured processing on all the content submitted by the App, and establish an index.

Step 406: Obtain a request for searching for an App.

Step 408: Find the corresponding App according to the search request.

Step 410: Obtain a content details viewing request or an order placing request of the selected App.

Step 412: Enable an already installed corresponding App according to the content details viewing request or the order placing request, and enter a corresponding content page.

Structured processing is performed on all the content submitted by the App. Therefore, Apps are conveniently managed together, searching is performed conveniently, and search efficiency is improved.

Figure 5:
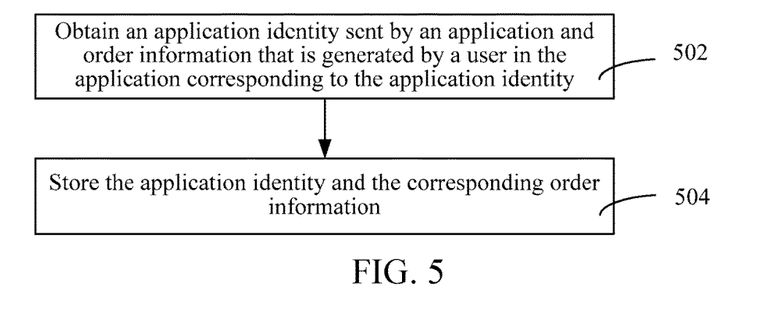
FIG. 5 is a flowchart of exchanging order information between an App and an App platform according to an embodiment.

FIG. 5 is a flowchart of exchanging order information between an App and an App platform according to an embodiment. As shown in FIG. 5, the method for logging in to an App further includes:

Step 502: Obtain an App ID sent by an App and order information generated by a user in the App corresponding to the App ID.

Step 504: Store the App ID and the corresponding order information.

The App ID and the corresponding order information are stored on the App platform. Therefore, the App platform conveniently manages the order information together.

Figure 6:
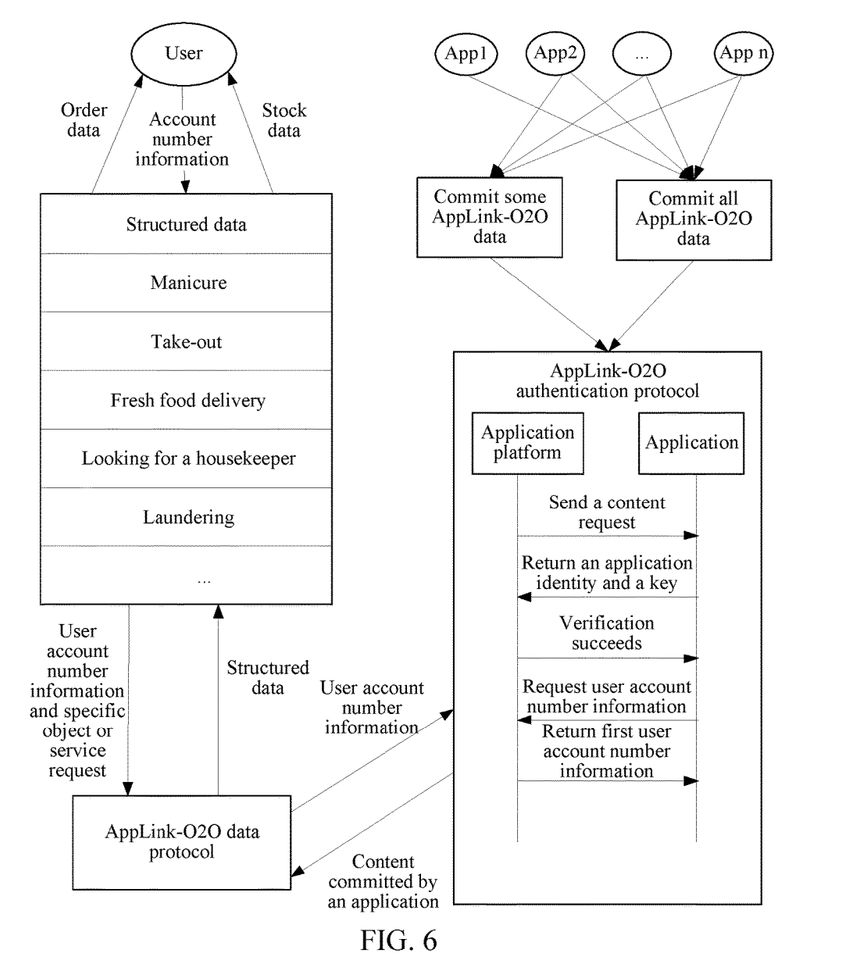
FIG. 6 is a schematic diagram of storing and processing an App by using the AppLink-O2O protocol according to an embodiment.

FIG. 6 is a schematic diagram of storing and processing an App by using the AppLink-O2O protocol according to an embodiment. As shown in FIG. 6, App providers of App 1, App 2, . . . , and App n select a proper manner to commit content of an App. For example, some choose to commit some AppLink-O2O data, and some choose to commit all AppLink-O2O data. An App platform verifies an App according to the AppLink-O2O authentication protocol: the App platform sends a content request to the App; the App returns an App ID and a key to the App platform; the App platform verifies the App according to the returned App ID and key, and after the verification succeeds, sends, to the App, a message that the verification succeeds and the App is allowed to obtain first user account number information of a user on the App platform; the App requests user account number information from the App platform; the App platform returns the first user account number information to the App. The App transmits the committed content to the App platform by using the AppLink-O2O data protocol, and the App platform performs structured processing, to obtain data on which structured processing is already performed. The data on which structured processing is already performed may include classes such as a manicure, take-out, fresh food delivery, looking for a housekeeper, and laundering. The App platform may display order data, stock data, and the like to the user. The user may input the first user account number information on the App platform to log on to the App platform.

Figure 7:
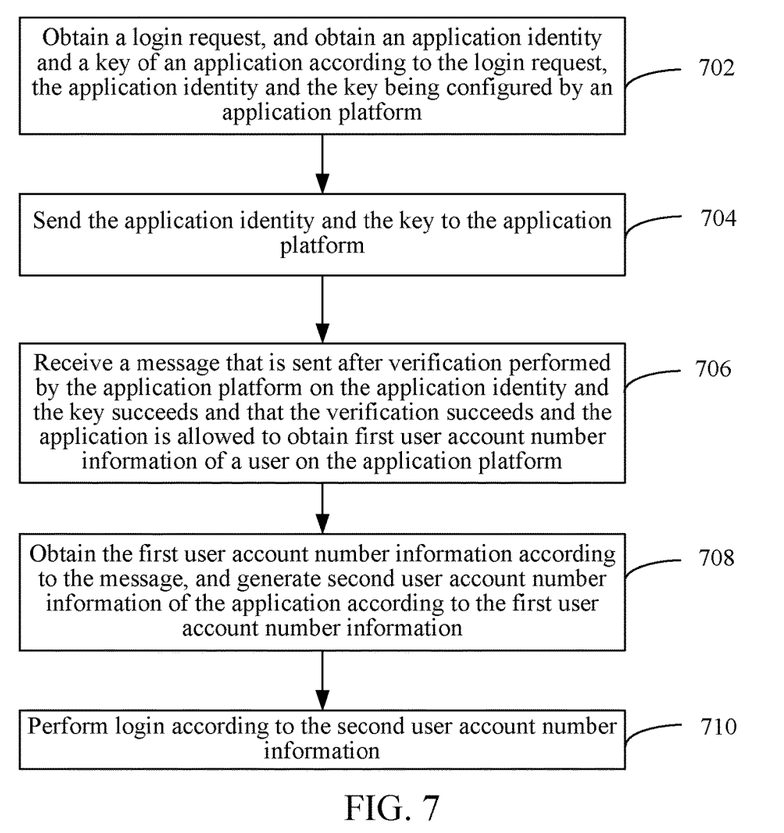
FIG. 7 is a flowchart of a method for logging in to an App according to another embodiment.

FIG. 7 is a flowchart of a method for logging in to an App according to another embodiment. As shown in FIG. 7, a method for logging in to an App is described from a perspective of an App, and includes the following steps:

Step 702: Obtain a login request, and obtain an App ID and a key of an App according to the login request, the App ID and the key being configured by an App platform.

Specifically, after obtaining an App uploaded by an App provider, the App platform distributes a unique App ID and a corresponding key to the App, so as to verify the App subsequently. After obtaining the login request, the App obtains the App ID and the corresponding key of the App.

Step 704: Send the App ID and the key to the App platform.

Specifically, the App ID and the key are sent to the App platform by using the AppLink-O2O data protocol, so that the App platform verifies the App ID and the key according to the AppLink-O2O authentication protocol.

Step 706: Receive a message that is sent after verification performed by the App platform on the App ID and the key succeeds and that the verification succeeds and the App is allowed to obtain first user account number information of a user on the App platform.

Step 708: Obtain the first user account number information according to the message, and generate second user account number information of the App according to the first user account number information.

Specifically, after the verification performed on the App succeeds, the App platform may grant a permission of allowing the App to obtain the first user account number information of the user on the App platform. After obtaining the first user account number information, the App may combine the second user account number information with reference to the App ID, or generate the second user account number information by adding a predetermined character and the like, or combine the first user account number information and the App ID to calculate an information digest value, and use the information digest value as the second user account number information, and so on. The present disclosure is not limited thereto.

Step 710: Perform login according to the second user account number information.

In the method for logging in to an App, after verification on an App ID and a key succeeds, an App is allowed to obtain first user account number information of a user on an App platform, and generates second user account number information according to the first user account number information, and the App is logged in to by using the second user account number information. The user no longer needs to register an account number with the App. In this way, the user account number is synchronized and shared, and operations are convenient. Moreover, personal information of a user does not need to be filled in each installed App, reducing probability that the personal information of the user is leaked, and improving information security.

In an embodiment, the method for logging in to an App further includes: committing content of the App to the App platform, so that the App platform performs structured processing on the committed content of the App and establishes an index.

Specifically, the content submitted by the App may include some content or all content. For example, there are 100 objects or services on an O2O service App, and according to requirements, only some (for example, 20) of the 100 objects or services may be committed to the App platform, or all the 100 objects or services are committed to the App platform.

The App commits content according to the AppLink-O2O protocol. Each service or object in the content of the App may include a title, descriptions, a price, transportation costs, a picture, and the like, and the present disclosure is not limited thereto. Key attributes of the content of the App in the AppLink-O2O protocol are shown in Table 1. In addition, after structured processing is performed on the committed content of the App, the App is classified according to the committed content of the App, and Apps of the same class are placed together.

Structured processing is performed on the content submitted by the App, and an index is established, so that it is easy to classify and search structured content information, the content information is aggregated together, and a user may directly find a required service. Moreover, for a region and a service or an object, searching may also be performed, improving information searching efficiency.

In another embodiment, an open SDK may be provided on the App platform, the SDK is provided to the App provider, and after the SDK is integrated in the App, the App commits content by using the SDK.

In an embodiment, the method for logging in to an App further includes: periodically sending updated content of the App to the App platform, so that the App platform updates content of the App on the App platform according to the updated content. Specifically, a periodic period may be negotiated by the App provider with the App platform. For example, update is performed once every two hours, once every one day, or the like. The updated content of the App may be descriptions, a stock status, price information, a picture, a time at which a service starts every day and a time at which a service ends every day, discount information, or the like, and the present disclosure is not limited thereto.

In an embodiment, the method for logging in to an App further includes: periodically sending stock status information of an object or a service of the App to the App platform, so that the App platform updates stock data of the object or the service of the App on the App platform according to the stock status information of the object or the service. Specifically, the stock status information varies at any time. This can improve update frequency, the stock data of the object or the service of the App on the App platform is conveniently updated in time, and learning latest stock data in time by a user is ensured.

In an embodiment, the method for logging in to an App further includes: obtaining order information generated in the App; and sending the App ID and the corresponding order information to the App platform, so that the App platform stores the App ID and the corresponding order information. The App ID and the corresponding order information are stored on the App platform. Therefore, the App platform conveniently manages the order information together.

Figure 8:
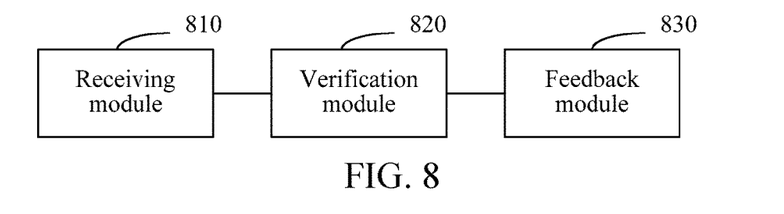
FIG. 8 is a structural block diagram of an apparatus for logging in to an App according to an embodiment.

FIG. 8 is a structural block diagram of an apparatus for logging in to an App according to an embodiment. Function modules in the apparatus for logging in to an App in FIG. 8 are corresponding to function modules constructed in the method for logging in to an App in FIG. 2, but a division manner is not limited to this division manner. As shown in FIG. 8, the apparatus for logging in to an App is described from the perspective of an App platform, and includes a receiving module 810, a verification module 820, and a feedback module 830.

The receiving module 810 is configured to receive an App ID and a key, which are sent according to a login request of an App, of the App, the App ID and the key being configured by an App platform.

After obtaining an App uploaded by an App provider, the App platform distributes a unique App ID and a corresponding key to the App, so as to verify the App subsequently.

The verification module 820 is configured to verify the obtained App ID and key.

Specifically, after the App platform receives the sent App ID and the corresponding key, the verification module 820 compares the received App ID and key with an App ID and a key, which are stored on the App platform, of the App. If the received App ID and key are the same as the App ID and the key, which are stored on the App platform, of the App, the verification succeeds; or if the received App ID and key are different from the App ID and the key, which are stored on the App platform, of the App, the verification fails. After the verification succeeds, a message that the verification succeeds and the App is allowed to obtain first user account number information of the user on the App platform may be sent to the App, and the message that the verification succeeds and the App is allowed to obtain the first user account number information of the user on the App platform is displayed on a webpage corresponding to the App or on an App login interface. After the verification fails, prompt information that the verification fails may be sent to the App, and the prompt information that the verification fails is displayed on the webpage corresponding to the App or on the App login interface.

The feedback module 830 is configured to send, if the verification succeeds, to the App, a message that the verification succeeds and the App is allowed to obtain first user account number information of the user on the App platform, so that the App obtains the first user account number information according to the message, generates second user account number information of the App according to the first user account number information, and logs in to the App according to the generated second user account number information.

A request for registering with the App platform by the user is obtained, the first user account number information is distributed according to the registration request, and personal information filled in by the user is obtained. The personal information of the user may include one or more of a user name, an ID card number, a mobile communication identifier, an email box, a work address, an employer, or a dwelling address, and the present disclosure is not limited thereto. The first user account number information may include a user account number, a user name, and the like of the user on the App platform. The user account number may be a sequence number, a mobile number of the user, an email box of the user, an instant communication number, or the like distributed by the App platform. The user name may be a name including one or more of a number, a letter, or a character, may be another name or the like.

After the verification performed on the App succeeds, the App platform may grant a permission of allowing the App to obtain the first user account number information of the user on the App platform. After obtaining the first user account number information, the App may combine the second user account number information with reference to the App ID, or generate the second user account number information by adding a predetermined character and the like, or combine the first user account number information and the App ID to calculate an information digest value, and use the information digest value as the second user account number information, and so on. The present disclosure is not limited thereto.

For the apparatus for logging in to an App, after verification on an App ID and a key succeeds, an App is allowed to obtain first user account number information of a user on an App platform, and generates second user account number information according to the first user account number information, and the App is logged in to by using the second user account number information. The user no longer needs to register an account number with the App. In this way, the user account number is synchronized and shared, and operations are convenient. Moreover, personal information of a user does not need to be filled in each installed App, reducing probability that the personal information of the user is leaked, and improving information security.

Figure 9:
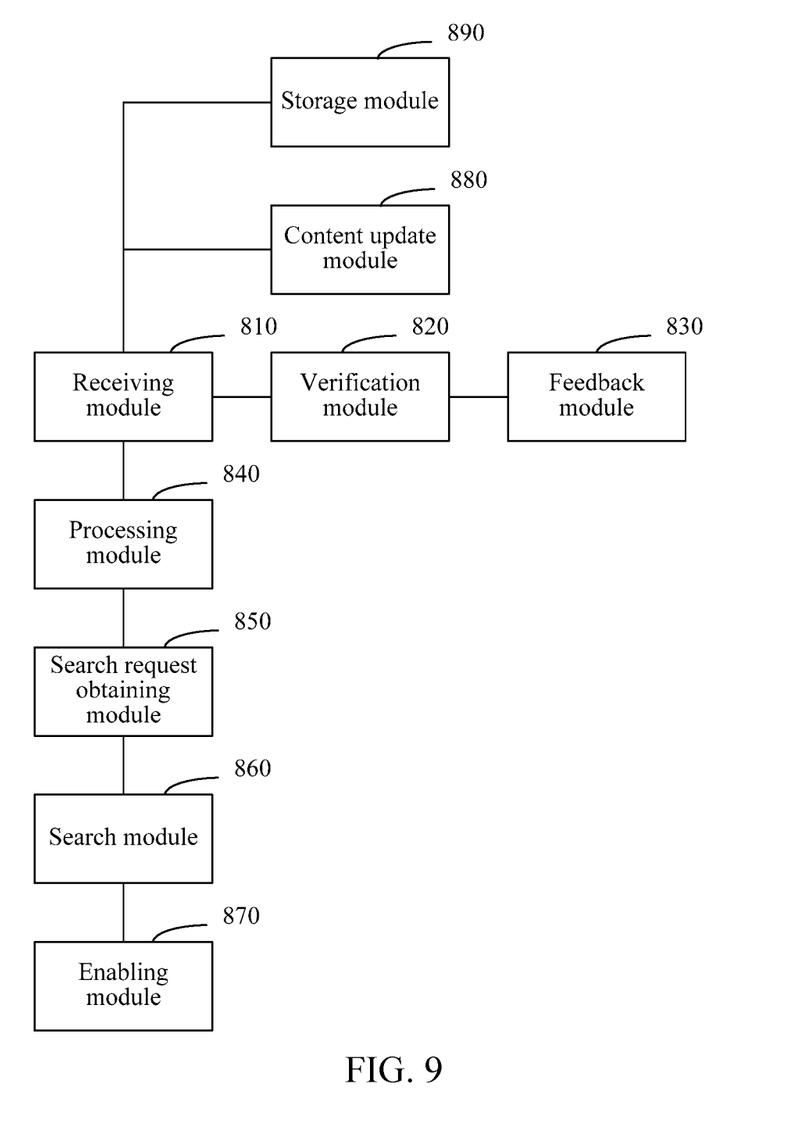
FIG. 9 is a structural block diagram of an apparatus for logging in to an App according to another embodiment.

As shown in FIG. 9, an apparatus for logging in to an App is described from a perspective of an App platform, and in addition to the receiving module 810, the verification module 820, and the feedback module 830, may further include a processing module 840, a search request obtaining module 850, a search module 860, an enabling module 870, a content update module 880, and a storage module 890.

The receiving module 810 is further configured to obtain content submitted by an App.

Specifically, the content submitted by the App may include some content or all content. For example, there are 100 objects or services on an O2O service App, and according to requirements, only some (for example, 20) of the 100 objects or services may be committed to the App platform, or all the 100 objects or services are committed to the App platform.

The processing module 840 is configured to: perform structured processing on the content submitted by the App, and establish an index.

After structured processing is performed on the committed content of the App, the App is classified according to the committed content of the App, and Apps of the same class are placed together.

The search request obtaining module 850 is configured to: perform structured processing on the committed content, and establish an index obtaining search request.

Specifically, the search request may include one or more search keywords, and the search keywords may include a content name, a location (e.g., the latitude and the longitude) of a service, a price range of the service, and the like. Searching is performed based on the index according to the search request, and a corresponding App may be found. Found Apps may be displayed in a descending order of matching degrees. A matching degree is a degree of matching the search keywords in the search request.

The search module 860 is configured to find a corresponding App according to the search request.

The enabling module 870 is configured to: obtain a content details viewing request or an order placing request of the selected App, and enable the corresponding installed App according to the details viewing request or the order placing request or prompt for installation of the App.

The receiving module 810 is further configured to periodically obtain content updated by the App.

The content update module 880 is configured to update content of the App on the App platform according to the updated content of the App.

Specifically, a periodic period may be negotiated by the App provider with the App platform. For example, update is performed once every two hours, once every one day, or the like. The updated content of the App may be descriptions, a stock status, price information, a picture, a time at which a service starts every day and a time at which a service ends every day, discount information, or the like, and the present disclosure is not limited thereto.

The receiving module 810 is further configured to obtain stock status information of an object or a service that is periodically sent by the App.

The content update module 880 is further configured to update stock data of the object or the service of the App on the App platform according to the stock status information of the object or the service. The stock status information varies at any time. This can improve update frequency, the stock data of the object or the service of the App on the App platform is conveniently updated in time, and learning latest stock data in time by a user is ensured.

The receiving module 810 is further configured to obtain an App ID sent by an App and order information generated by the user in the App corresponding to the App ID.

The storage module 890 is configured to store the App ID and the corresponding order information.

The App ID and the corresponding order information are stored on the App platform. Therefore, the App platform conveniently manages the order information together.

Figure 10:
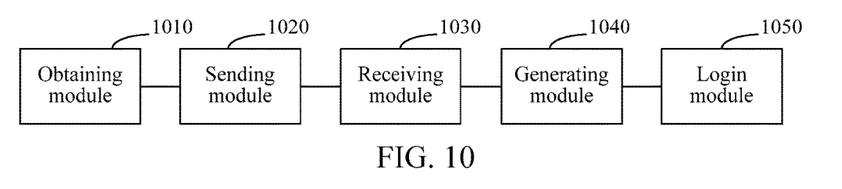
FIG. 10 is a structural block diagram of an apparatus for logging in to an App according to another embodiment.

FIG. 10 is a structural block diagram of an apparatus for logging in to an App according to another embodiment. Function modules in the apparatus for logging in to an App in FIG. 10 are corresponding to function modules constructed in the method for logging in to an App in FIG. 7. As shown in FIG. 10, the apparatus for logging in to an App is described from the perspective of an App, and includes an obtaining module 1010, a sending module 1020, a receiving module 1030, a generating module 1040, and a login module 1050.

The obtaining module 1010 is configured to: obtain a login request, and obtain an App ID and a key of an App according to the login request, the App ID and the key being configured by an App platform.

Specifically, after obtaining an App uploaded by an App provider, the App platform distributes a unique App ID and a corresponding key to the App, so as to verify the App subsequently. After obtaining the login request, the App obtains the App ID and the corresponding key of the App.

The sending module 1020 is configured to send the App ID and the key to the App platform.

Specifically, the App ID and the key are sent to the App platform by using the AppLink-O2O data protocol, so that the App platform verifies the App ID and the key according to the AppLink-O2O authentication protocol.

The receiving module 1030 is configured to receive a message that is sent after verification performed by the App platform on the App ID and the key succeeds and that the verification succeeds and the App is allowed to obtain first user account number information of a user on the App platform.

The generating module 1040 is configured to: obtain the first user account number information of the user on the App platform according to the message, and generate second user account number information of the App according to the first user account number information.

Specifically, after the verification performed on the App succeeds, the App platform may grant a permission of allowing the App to obtain the first user account number information of the user on the App platform. After obtaining the first user account number information, the App may combine the second user account number information with reference to the App ID, or generate the second user account number information by adding a predetermined character and the like, or combine the first user account number information and the App ID to calculate an information digest value, and use the information digest value as the second user account number information, and so on. The present disclosure is not limited thereto.

The login module 1050 is configured to perform login according to the second user account number information.

For the apparatus for logging in to an App, after verification on an App ID and a key succeeds, an App is allowed to obtain first user account number information of a user on an App platform, and generates second user account number information according to the first user account number information, and the App is logged in to by using the second user account number information. The user no longer needs to register an account number with the App. In this way, the user account number is synchronized and shared, and operations are convenient. Moreover, personal information of a user does not need to be filled in each installed App, reducing probability that the personal information of the user is leaked, and improving information security.

In an embodiment, the sending module 1020 is further configured to commit content of the App to the App platform, so that the App platform performs structured processing on the committed content of the App and establishes an index.

In an embodiment, the sending module 1020 is further configured to periodically send updated content of the App to the App platform, so that the App platform updates content of the App on the App platform according to the updated content.

In an embodiment, the sending module is further configured to periodically send stock status information of an object or a service of the App to the App platform, so that the App platform updates stock data of the object or the service of the App on the App platform according to the stock status information of the object or the service.

Figure 11:
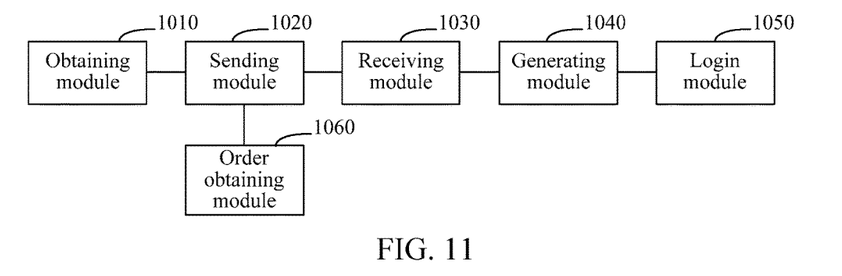
FIG. 11 is a structural block diagram of an apparatus for logging in to an App according to another embodiment.

As shown in FIG. 11, the apparatus for logging in to an App is described from the perspective of an App, and in addition to the obtaining module 1010, the sending module 1020, the receiving module 1030, the generating module 1040, and the login module 1050, further includes an order obtaining module 1060.

The order obtaining module 1060 is configured to obtain order information generated in an App.

The sending module 1020 is further configured to send the App ID and the corresponding order information to an App platform, so that the App platform stores the App ID and the corresponding order information.

It should be understood by a person of ordinary skill in the art that all or a part of the procedures of the method according to the embodiments may be implemented by a computer program instructing relevant hardware. The program can be stored in a non-volatile computer readable storage medium, and when the program is executed, the program can include the procedures of the embodiments of the foregoing methods. The storage medium may be a magnetic disk, an optical disc, a read-only memory (ROM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for logging in to an application (App) by an end user performed at an application platform running at a computer server having one or more processors and memory storing one or more programs to be executed by the one or more processors, the method comprising:
receiving a login request from a server associated with the application, wherein the login request corresponds to a second login request submitted by the end user from a terminal;
obtaining an App identity (ID) and a key from the login request;
verifying the obtained App ID and key with predefined information associated with the application and the terminal; and
in accordance with a determination that the verification succeeds:
sending, to the application server, a message including first user account number information of the end user at the application platform,
wherein the application server is configured to generate a second user account number information of the end user at the application according to the first user account number information and return the second user account number information to the terminal so that the end user can log into the application using the second user account number information.

2. The method according to claim 1, further comprising:
obtaining content submitted by the application;
performing structured processing on the content submitted by the application;
establishing an index for the structured content.

3. The method according to claim 2, further comprising:
obtaining a search request from the end user at the terminal, the search request including one or more search keywords;
finding a corresponding application according to the one or more search keywords;
enabling the end user at the terminal to log into the corresponding application in accordance with a determination that the corresponding application has been installed on the terminal; and
automatically installing the corresponding application on the terminal in accordance with a determination that the corresponding application has not been installed on the terminal.

4. The method according to claim 3, wherein the one or more search keywords include at least one of a content name, a location of a service, and a price range of the service.

5. The method according to claim 1, wherein the login request from the application server is the same as the second login request submitted by the end user from the terminal.

6. The method according to claim 1, wherein the predefined information is assigned to the application and the terminal by the application platform in response to a request from the terminal to download the application from the application platform and install the application on the terminal.

7. The method according to claim 6, wherein the first user account number information is assigned to the end user for logging into the application platform.

8. The method according to claim 6, wherein the second user account number information of the end user is returned to and stored at the application platform.

9. The method according to claim 8, wherein the second user account number information of the end user is encrypted by the key before being returned to the terminal.

10. The method according to claim 8, wherein the second user account number information of the end user has an expiration timestamp such that a new login request is sent to the application platform for generating new second user account number information of the end user after the expiration timestamp.

11. A computer server hosting an application platform supporting logging in to an application (App) by an end user, the computer server comprising:
one or more processors;
memory; and
one or more programs stored in the memory that, when executed by the one or more processors, causes the computer server to perform a plurality of operations including:
receiving a login request from a server associated with the application, wherein the login request corresponds to a second login request submitted by the end user from a terminal;
obtaining an App identity (ID) and a key from the login request;
verifying the obtained App ID and key with predefined information associated with the application and the terminal; and
in accordance with a determination that the verification succeeds, sending, to the application server, a message including first user account number information of the end user at the application platform, wherein the application server is configured to generate second user account number information of the end user at the application according to the first user account number information and return the second user account number information to the terminal so that the end user can log into the application using the second user account number information.

12. The computer server according to claim 11, wherein the plurality of operations further include:
obtaining content submitted by the application;
performing structured processing on the content submitted by the application;
establishing an index for the structured content.

13. The computer server according to claim 12, wherein the plurality of operations further include:
obtaining a search request from the end user at the terminal, the search request including one or more search keywords;
finding a corresponding application according to the one or more search keywords;
enabling the end user at the terminal to log into the corresponding application in accordance with a determination that the corresponding application has been installed on the terminal; and automatically installing the corresponding application on the terminal in accordance with a determination that the corresponding application has not been installed on the terminal.

14. The computer server according to claim 13, wherein the one or more search keywords include at least one of a content name, a location of a service, and a price range of the service.

15. The computer server according to claim 11, wherein the predefined information is assigned to the application and the terminal by the application platform in response to a request from the terminal to download the application from the application platform and install the application on the terminal.

16. The computer server according to claim 15, wherein the first user account number information is assigned to the end user for logging into the application platform.

17. The computer server according to claim 15, wherein the second user account number information of the end user is returned to and stored at the application platform.

18. The computer server according to claim 17, wherein the second user account number information of the end user is encrypted by the key before being returned to the terminal.

19. The computer server according to claim 17, wherein the second user account number information of the end user has an expiration timestamp such that a new login request is sent to the application platform for generating new second user account number information of the end user after the expiration timestamp.

20. A non-transitory computer readable storage medium in connection with a computer server having one or more processors hosting an application platform, the computer readable storage medium storing one or more programs supporting logging in to an application (App) by an end user, wherein the one or more programs are configured to be executed by the one or more processors and cause the computer server to perform a plurality of operations including:
receiving a login request from a server associated with the application, wherein the login request corresponds to a second login request submitted by the end user from a terminal;
obtaining an App identity (ID) and a key from the login request;
verifying the obtained App ID and key with predefined information associated with the application and the terminal; and
in accordance with a determination that the verification succeeds, sending, to the application server, a message including first user account number information of the end user at the application platform, wherein the application server is configured to generate second user account number information of the end user at the application according to the first user account number information and return the second user account number information to the terminal so that the end user can log into the application using the second user account number information.

* * * * *